T. SLAWSON.
BEET TOPPER.
APPLICATION FILED JUNE 16, 1914.
1,149,411.
Patented Aug. 10, 1915.
2 SHEETS—SHEET 1.
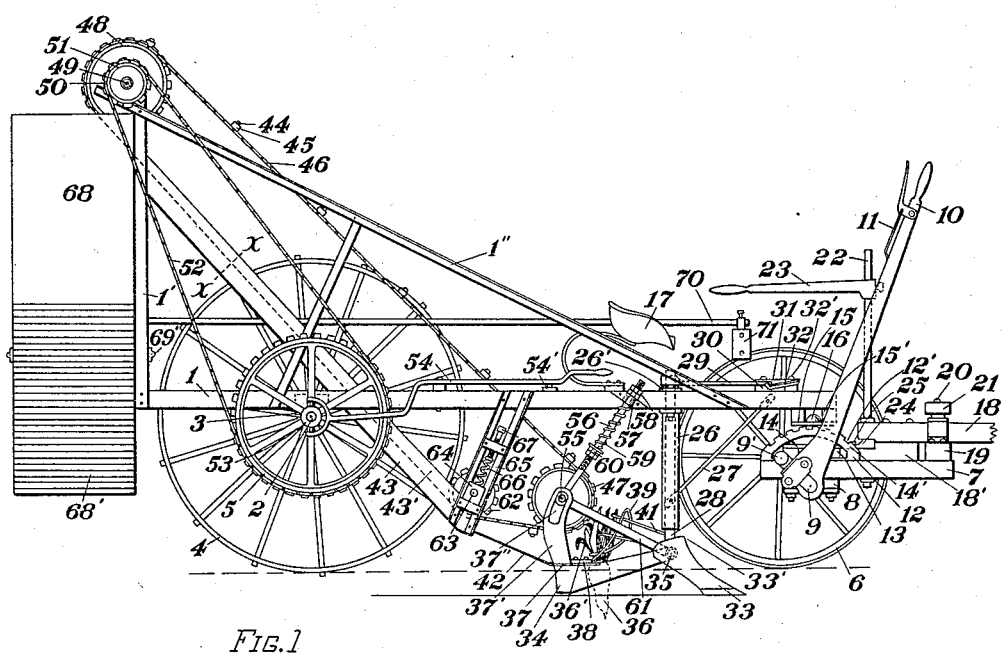
Fig.1
Fig.4
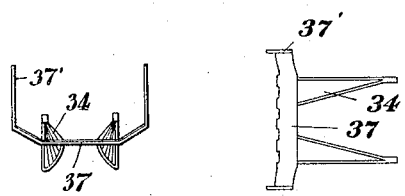
Fig.3
WITNESSES:
D. E. Neibel
Anna Persons.
INVENTOR
Thomas Slawson
BY
George W Hinton
ATTORNEY

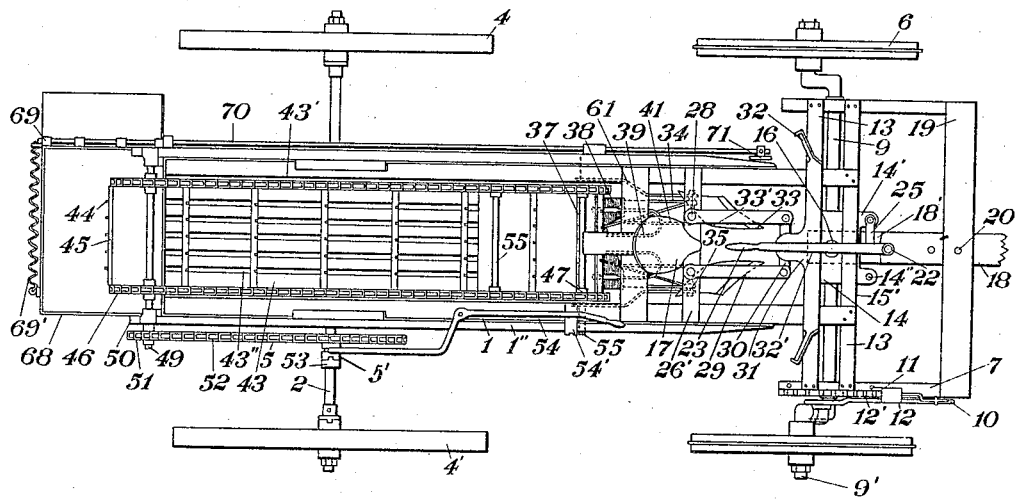
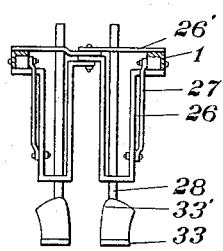

UNITED STATES PATENT OFFICE.

THOMAS SLAWSON, OF NEAR REA, MISSOURI.

BEET-TOPPER.

1,149,411.   Specification of Letters Patent.   Patented Aug. 10, 1915.

Application filed June 16, 1914. Serial No. 845,431.

*To all whom it may concern:*

Be it known that I, THOMAS SLAWSON, a citizen of the United States, residing near Rea, in the county of Andrew and State of Missouri, have invented certain new and useful Improvements in Beet-Toppers, of which the following is a specification, reference being had therein to the accompanying drawing.
My invention relates to improvements in that class of beet toppers, which are designed to properly cut tops from beets, while the same are standing in the field where they are grown. The objects of my improvements are, first; to provide a simple, substantial and durable implement of this class, by the use of which a furrow is plowed at each side of a row of beets, and the tops of the same are properly cut therefrom, regardless of the height to which said beets extend above the ground, to elevate said tops into a box, and to provide manually operated dumping means, whereby said box is emptied of tops onto the ground; second;
to provide ready means for guiding said topper and plow guiding means whereby the plows are guided; third; to provide raising and lowering means, whereby the depth of said plows in the ground is regulated, and whereby said plows and the beet topping devices are raised above the ground for transporting the same from place to place, when not in operation as a topper; fourth; to so construct an implement of this class, that the same shall be neat in appearance and comparatively cheap in cost of manufacture. I attain these objects by the mechanism illustrated in the accompanying drawings, in which:—
Figure 1 is a side elevation of the beet topper, the right wheels of the same being removed to avoid obscurity. Fig. 2 is a top plan. Fig. 3 is a top plan of the runners and hinge bar. Fig. 4 is a rear view of the parts shown in Fig. 3. Fig. 5 is a front view of the plow frame and plows. Fig. 6 is a transverse section of the elevator, on the line X X, seen in Fig. 1.

Referring to Fig. 1, the end portion of frame 1 is mounted on rear axle 2, and is provided with journal boxes 3, in which said axle is rotatable. Left rear wheel 4 is rotatably mounted on the left end of said axle. The right end of said axle is secured in right rear wheel 4', which acts as a drive wheel therefor, as seen in Fig. 2. Drive sprocket 5, (see Fig. 1,) is loosely mounted on said axle, and is disengageably engaged therewith, for driving the hereinafter described elevator.

The front end of frame 1 is mounted on front wheels 6, by the following described parts: Hounds 7 are provided with journal boxes 8, secured thereunder, in which the cranked front axle 9 is rotatable. The cranked extremities 9' of said axle, have said front wheels 6 rotatably mounted thereon. The lower end of lift lever 10 is secured to one of the cranked portions of said axle, and is held in its various adjustments by latch-bolt 11, which engages ratchet notches 12' formed in segment 12, which latter is securely mounted on one of the hounds 7, for lifting and adjustably holding the front end of frame 1 at any desired height. Sandboards 13 are secured transversely on the rear end portions of hounds 7, and have sandboard plate 14 secured thereon. Said plate has its upper face rounded and has extension 14' formed on the front edge thereof. Said extension has apertures 14'' formed therethrough. Bolster plate 15 has its lower surface rounded and resting on said sandboard plate. King bolt 16 is passed through both of said plates and together with the previously described parts forms pivotal mounting means for the front end of frame 1, which latter is secured on bolsters 15', secured on said bolster plate. Said frame has seat 17 securely mounted thereon, from which the operator operates the following described tongue guiding means and the lift lever 10. Tongue 18 is pivotally mounted on connection 19, by bolt 20 which bolt also pivotally secures double-tree 21 on said tongue. The ends of said connection are secured on the front ends of said hounds 7. The rear end of said tongue has the offset tongue extension 18' secured thereunder, the rear end of said extension being extended between axle 9 and sandboards 13. The vertical shaft 22 has its lower end portion rotatably mounted in the rear end of said tongue and also in the central portion of said tongue extension. Said shaft has guiding lever 23 secured on its upper end and adjustable as to height. Said shaft has crank 24 secured thereon; the end of said crank being link connected with sandboard plate extension 14' by link 25.

Plow frames 26 and plow frame plates 26' have their outer ends adjustably secured on frame 1 and their inner ends adjustably secured together, as seen in Fig. 6. Said frames are provided with brace rods 27 the upper ends of which are secured to frame 1. Plow posts 28 are rotatably mounted in said frames and have arms 29, (see Figs. 1 and 2,) secured on the upper ends thereof. The front ends of said arms are pivotally connected by rod 30, the center of which is pivotally connected with the slotted arm 31, formed with foot lever 32, which latter is pivotally mounted at 32', on frame 1. Plows 33 are secured on the lower ends of said posts 28, and are adapted to plow and turn earth outward from each other. Said plows have their upper inner corners curved upward and outward for widening the space therebetween and adapting the same to freely pass beets of large diameter.

The self adjusting top cutter comprises the following described parts: The front ends of runners 34 are loosely mounted on wristpins 35, the inner ends of which are secured in plow posts 28. Said runners are preferably formed of sheet plow steel of light weight, and are trailed in the furrows formed by said plows. The inner surfaces of said runners are rounded downward and outward, and laterally incline toward each other from front to their rear ends; thereby adapting the same, to a considerable extent, to be forced upward by a beet 36, while being dragged thereover. The outer surfaces of said runners are parallel and adapted to guide them in the described furrows, not designated. Hinge bar 37 is secured upon the rear ends of said runners and extends across the space therebetween. The cutting blade 38 is similarly secured and extended, directly in front of and against said hinge bar. The front or cutting edge of said blade is laterally sloped, as seen in Fig. 2, and is sharpened for cutting tops 36', (see Fig. 1,) from beet 36. Said runners and the thereon carried blade 38, are still farther adjusted to the height of said beet by gage rods 39, the free end portions of which slope downward and backward and ride upon the top of said beet and lift said blade 38 to the desired height for properly cutting tops 36' from beet 36.

The front edges of plows 33 are adapted to lift and to a certain extent guide tops 36' into a vertical position, while fender rods 41 have their front ends secured to said plows and their rearwardly extended free end portions adapted to continue the said guiding of said tops, until the same are reached by blade 38.

The previously mentioned elevator comprises the following described parts, for elevating said tops and discharging the same into the hereinafter described dump box. Hinge bar 37 has the front edge of the preferably sheet metal apron 42 hinged thereto for supporting the severed tops 36'. The rear edge of said apron loosely rests upon the lower end portion of the elevator bottom 43, which latter is securely mounted in frame 1. Said bottom is preferably formed of sheet metal and has longitudinal channels 43'' formed therein. Said channels, (see Fig. 6,) are so arranged that carrier teeth 44 freely travel longitudinally therethrough. Said teeth are secured in slats 45 carried by sprocket chains 46, which are extended around lower wheels 47 and upper wheels 48. The last mentioned wheels are secured on upper shaft 49, rotatably mounted in journal boxes 50, secured on frame uprights 1' and frame braces 1''. Shaft 49 has sprocket wheel 51 secured on the right end thereof, said wheel being driven by sprocket chain 52, which passes around said wheel and around the previously mentioned drive sprocket 5. Said drive sprocket has ratcheted hub 5' formed therewith, which latter has the usual and undesignated channel formed therearound said channel being engaged by shift lever 54, for sliding said ratcheted hub into engagement with and out of engagement from ratcheted collar 53, secured on rear axle 2. Shift lever 54 is pivotally mounted on frame 1, and is provided with holding plate 54', secured on frame 1, said plate being adapted to hold the free end of said shift lever, for thereby holding said parts either in engagement or disengagement, as desired. Lower sprocket wheels 47 are secured on shaft 55, each end of which is provided with a set of mounting devices, and since said sets are alike in construction and operation, but one set of devices is described. One end of said shaft is rotatably mounted in the lower end of bearing rod 56, the upper end of which is slidably guided by sleeve 57, secured on frame 1. Nut and lock nut 58, screwed on the upper end of said rod, limit downward movement of same, which is thereby adjusted as desired. Spiral spring 59 is mounted on said rod and actuates the same to move downward. The tension of said spring is adjustably secured by nut and lock nut 60, screwed on the intermediate portion of said rod. The end of shaft 55 is also rotatably mounted in the rear end of bar 61, the front end of which is loosely mounted on wrist pin 35. Said end of said shaft is also passed through slot 37'', formed in the upper end of lift bar 37', which is formed with hinge bar 37, for lifting said hinge bar and the thereto attached parts, as hereinafter described.

Idle sprockets 62 are secured on idle shaft 63, each end of which is provided with mounting means of the following description: One end of said shaft is rotatably mounted in box 64, slidably guided between box guides 65, the lower ends of which are secured to elevator sides 43', while their upper ends are secured to frame 1. Said box 64 is elastically held at the limit of its downward movement, by spiral spring 66, the tension of which is adjusted by screw 67.

Referring to Figs. 1 and 2, beet top box 68 is secured to frame 1 and upright 1', and is provided with inclined, projected bottom, 68', adapted to cause beet tops to gravitate therefrom. Said box is provided with door 69, hinged on the rear end portion of door shaft 70, rotatably mounted on upright 1' and brace 1''. The front end of said shaft has knee lever 71 secured thereon, whereby the same is rotated for opening said door. Said door is provided with recover springs 69', for recovering outward movement of the lower edge portion said door, and closing the same.

In the operation of the described beet topper, with the parts in the position shown, the machine is drawn by a team, hitched in the usual manner, to double-tree 21, while the operator acts as driver of said team and sits in seat 17. Said operator has the team guiding lines, thrown over his shoulder, in the usual manner, his feet resting on the ends of foot lever 32, and thereby guides plows 33. With his left hand, said operator grasps guide lever 23, and thereby guides tongue 18, either toward the right or left, as occasion requires. With his right hand he operates lift lever 10, and thereby regulates the depth of plows 33 in the ground, and by the same lifts the front end of frame 1, and thus lifts all of the thereto attached parts, including said plows, above the ground for transporting the machine. He then pushes the front end of shift lever 54 toward the right. (see Fig. 2,) and thereby disengages the elevator drive sprocket 5 from its engagement with axle 2, thereby throwing the described elevator out of gear, after which said topper is transported on its wheels, as desired. When it is desired to again top beets, the parts of the machine are brought to the position shown, by reversing the previously described operations. As the entire machine is again drawn toward the right, tops 36' are cut from beets 36, by the blade 38, and gravitate onto apron 42, from which they are dragged by teeth 44, upward along elevator bottom 43, from which they gravitate into box 68. When said box is sufficiently filled with tops, the operator (on seat 17) with his left knee, presses the lower end of lever 71 outward, thereby rotates door shaft 70, overcomes recover springs 69' and swings the bottom of said door outward, upon which said tops gravitate from said box onto the ground. Upon removal of said operator's knee, said recover springs close said door.

If during the previously described operations, tops 36' should become piled or clogged beneath slats 45, the elastic holding means of lower sprockets 47 and idle sprockets 62, permit said wheels and the thereby guided slats to move upward and to pass over the same, said tops being moved by the next succeeding slat.

It will be understood from the foregoing description of the tongue guiding, and the plow guiding mechanisms, that said operator is enabled by the use of same to accurately guide the machine and keep the same in alinement with a row of beets.

Having fully described my invention, what I claim as new and original, and desire to secure by Letters Patent is:—

1. A transportably supported frame; a pair of plows carried by said frame for plowing a furrow at each side of a row of beets; a pair of runners; dragging means whereby said runners are dragged behind said plows in said furrows; and a cutting blade secured transversely on the rear end portions of said runners said blade being extended across the space therebetween the front edge of said blade being adapted to cut tops from beets.

2. In a beet topper, a pair of runners adapted to be dragged in a pair of furrows, the outer surfaces of said runners being parallel to each other while their inner surfaces are inclined backward toward each other said inner surfaces being rounded downward and outward; a cutting blade adapted to cut the tops from beets, said blade having a laterally inclined and sharpened front edge and having its ends secured on the rear end portions of said runners and being extended across the space therebetween; and dragging means whereby said runners are dragged.

3. In a beet topper, a cutting blade adapted to cut the tops from beets; a pair of runners whereon said blade is carried by the ends therof; a plurality of gage rods carried by said runners said rods having free end portions inclined downward and backward over the space between said runners, said inclined portions being adapted to be dragged over the tops of beets and thereby lift the rear ends of said runners and the thereon carried blade for gaging the depth of the cut of said blade.

4. In a beet topper, a pair of runners adapted to be dragged in a pair of furrows which are situated at each side of a row of beets; a hinge bar secured on the rear ends of said runners and extending across the space therebetween; a cutting blade similarly secured on said runners in front of and against said hinge bar, said blade having a laterally inclined and sharpened front edge adapted to cut the tops from said beets; an elevator for elevating said tops; and an apron having its front edge hinged to said hinge bar and its rear edge resting loosely on the lower end portion of the bottom of said elevator.

5. In a beet topper a transportably supported frame; a pair of plows carried by said frame said plows being adapted to plow a furrow at each side of a row of beets with a predetermined space between said plows, the inner upper corners of said plows being rounded upward and outward for widening the upper portion of said space; fender rods extending backward from said plows for guiding the tops of said beets; and cutting means for cutting the tops from said beets while the latter remain standing in the ground.

6. In a beet topper, a rotatably mounted plow post; a wrist pin secured in the lower end portion of said plow post; a plow secured on the lower end portion of said post said plow being adapted to plow a furrow along one side of a row of beets; a runner having its front end loosely mounted on said wrist pin and thereby dragged in said furrow; a similarly constructed and operated group of parts for the other side of said row of beets; and a cutting blade secured on the rear end portions of said runners and extending across the space therebetween, for cutting the tops from said row of beets.

7. In a beet topper a main frame for said topper; lifting means for lifting the front end of said frame; a plow frame carried by said main frame; a pair of plow posts carried by said plow frame at a predetermined distance from each other; a wristpin secured in the lower end of each one of said posts; a plow secured on the lower end of each one of said posts; a pair of runners trailed behind said plows the front ends of the runners being loosely pivoted on said wristpins respectively; a hinge bar secured on the rear end portions of said runners and extending across the space therebetween; a lift bar formed on each end of said hinge bar, the upper end portions of said lift bars each having a slot formed therethrough; a rotatably mounted lower sprocket shaft having its end portions projected through the slots in said lift bars; and a bearing rod for rotatably supporting each end of said shaft, said rods being connected with said main frame and adapted by their connected parts to lift the rear ends of said runners when the front end of said main frame is lifted.

In testimony whereof I affix my signature in the presence of two witnesses.

THOMAS SLAWSON.

Witnesses:
A. M. PETTIJOHN,
WM. SHEPHERD.

Copies of this patent may be obtained for five cents each, by addressing the " Commissioner of Patents, Washington, D. C."